(12) United States Patent
Tsai et al.

(10) Patent No.: US 10,951,063 B2
(45) Date of Patent: Mar. 16, 2021

(54) SUPPLYING-END MODULE OF INDUCTION TYPE POWER SUPPLY SYSTEM AND SIGNAL DETECTION METHOD THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 238 days.

(21) Appl. No.: 16/028,397

(22) Filed: Jul. 5, 2018

(65) Prior Publication Data

US 2018/0316227 A1    Nov. 1, 2018

Related U.S. Application Data

(63) Continuation-in-part of application No. 14/535,338, filed on Nov. 7, 2014, now Pat. No. 10,056,944.
(Continued)

(30) Foreign Application Priority Data

Feb. 1, 2011   (TW) .................................. 100103836
Mar. 14, 2012  (TW) .................................. 101108610
(Continued)

(51) Int. Cl.
*H02J 17/00*   (2006.01)
*H02J 7/10*    (2006.01)
(Continued)

(52) U.S. Cl.
CPC .............. *H02J 50/12* (2016.02); *H02J 50/80* (2016.02)

(58) Field of Classification Search
CPC ................................. H02J 50/12; H02J 50/80
See application file for complete search history.

(56) References Cited

U.S. PATENT DOCUMENTS 3,573,817 A     4/1971  Akers
8,536,981 B2 *  9/2013  Seban .............. G06K 19/07309
                                                340/572.4
(Continued)

FOREIGN PATENT DOCUMENTS

CN        1417931 A    5/2003
CN      101399464 A    4/2009
(Continued)

OTHER PUBLICATIONS

Ma et al., Analysis of metal foreign object setting on electric vehicle wireless power transfer system, <Advanced Technology of Electrical Engineering and Energy> vol. 36, No. 2, p. 14-20 ,Feb. 28, 2017.
(Continued)

*Primary Examiner* — Jared Fureman
*Assistant Examiner* — Esayas G Yeshaw
(74) *Attorney, Agent, or Firm* — Winston Hsu

(57) ABSTRACT

A supplying-end module for an induction type power supply system includes a supplying-end coil, a first driver, a second driver and a signal detector. The first driver, coupled to the supplying-end coil, is used for driving the supplying-end coil to send electric power. The second driver, coupled to the supplying-end coil, is used for controlling the supplying-end coil to output a detection signal. The signal detector, coupled to the supplying-end coil, is used for detecting a reflection signal corresponding to the detection signal.

20 Claims, 5 Drawing Sheets

Related U.S. Application Data which is a continuation-in-part of application No. 13/900,544, filed on May 23, 2013, now Pat. No. 9,600,021, which is a continuation-in-part of application No. 13/488,724, filed on Jun. 5, 2012, now Pat. No. 9,048,881, which is a continuation-in-part of application No. 13/154,965, filed on Jun. 7, 2011, now Pat. No. 8,810,072, said application No. 14/535,338 is a continuation-in-part of application No. 14/017,321, filed on Sep. 4, 2013, now Pat. No. 9,628,147, which is a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072, said application No. 14/017,321 is a continuation-in-part of application No. 13/541,090, filed on Jul. 3, 2012, now Pat. No. 9,075,587, said application No. 14/535,338 is a continuation-in-part of application No. 14/251,655, filed on Apr. 14, 2014, now Pat. No. 9,671,444, which is a continuation-in-part of application No. 14/017,321, filed on Sep. 4, 2013, now Pat. No. 9,628,147.

(30) Foreign Application Priority Data

| Feb. 4, 2013 | (TW) | 102104223 |
|---|---|---|
| May 3, 2013 | (TW) | 102115983 |
| Jan. 8, 2014 | (TW) | 103100707 |
| Jun. 6, 2014 | (TW) | 103119790 |
| Feb. 12, 2018 | (TW) | 107105016 |

(51) Int. Cl.
*H02J 50/12* (2016.01)
*H02J 50/80* (2016.01)

(56) References Cited

U.S. PATENT DOCUMENTS

| 8,731,116 | B2 | 5/2014 | Norconk | |
|---|---|---|---|---|
| 8,816,537 | B2* | 8/2014 | Ichikawa | H02J 7/025 |
| | | | | 307/104 |
| 9,143,002 | B2 | 9/2015 | Yeo | |
| 9,318,897 | B2 | 4/2016 | Brohlin | |
| 9,531,444 | B2 | 12/2016 | Bae | |
| 9,553,485 | B2 | 1/2017 | Singh | |
| 9,995,777 | B2 | 6/2018 | Von Novak, III | |
| 10,056,944 | B2 | 8/2018 | Tsai | |
| 10,122,220 | B2 | 11/2018 | Sankar | |
| 2001/0048541 | A1* | 12/2001 | Ishii | H04B 10/2507 |
| | | | | 398/201 |
| 2005/0258826 | A1 | 11/2005 | Kano | |
| 2007/0153937 | A1* | 7/2007 | Itkin | H03G 3/3042 |
| | | | | 375/297 |
| 2008/0106273 | A1 | 5/2008 | Bauer | |
| 2008/0303479 | A1* | 12/2008 | Park | H02J 7/00304 |
| | | | | 320/108 |
| 2009/0026844 | A1* | 1/2009 | Iisaka | H02J 50/10 |
| | | | | 307/104 |
| 2009/0167300 | A1 | 7/2009 | Cech | |
| 2009/0278651 | A1 | 11/2009 | Okada | |
| 2009/0284227 | A1* | 11/2009 | Mohammadian | H02J 7/025 |
| | | | | 320/137 |
| 2009/0319212 | A1 | 12/2009 | Cech | |
| 2010/0098177 | A1 | 4/2010 | Hamaguchi | |
| 2010/0213590 | A1 | 8/2010 | Warren | |
| 2010/0225173 | A1* | 9/2010 | Aoyama | H02J 50/12 |
| | | | | 307/104 |
| 2011/0062793 | A1 | 3/2011 | Azancot | |
| 2011/0097996 | A1 | 4/2011 | Kalanithi | |
| 2011/0199046 | A1 | 8/2011 | Tsai | |
| 2011/0241436 | A1 | 10/2011 | Furukawa | |
| 2012/0169132 | A1 | 7/2012 | Choudhary | |
| 2012/0188797 | A1* | 7/2012 | Nakanishi | H02M 3/33507 |
| | | | | 363/21.02 |
| 2013/0057079 | A1 | 3/2013 | Park | |
| 2013/0065518 | A1 | 3/2013 | Byun | |
| 2013/0082653 | A1 | 4/2013 | Lee | |
| 2013/0106197 | A1 | 5/2013 | Bae | |
| 2013/0109305 | A1* | 5/2013 | Savoj | G06K 19/07749 |
| | | | | 455/41.1 |
| 2013/0147279 | A1 | 6/2013 | Muratov | |
| 2013/0147281 | A1* | 6/2013 | Kamata | H02J 7/025 |
| | | | | 307/104 |
| 2013/0169060 | A1* | 7/2013 | Jung | H04B 5/0037 |
| | | | | 307/104 |
| 2013/0234503 | A1 | 9/2013 | Ichikawa | |
| 2014/0015329 | A1 | 1/2014 | Widmer | |
| 2014/0197783 | A1 | 7/2014 | Kim | |
| 2014/0266031 | A1* | 9/2014 | Sasaki | H01F 38/14 |
| | | | | 320/108 |
| 2014/0333153 | A1 | 11/2014 | Tanaka | |
| 2014/0339907 | A1 | 11/2014 | Omae | |
| 2015/0180286 | A1 | 6/2015 | Asanuma | |
| 2015/0263531 | A1 | 9/2015 | Kozakai | |
| 2015/0349573 | A1 | 12/2015 | Tschirhart | |
| 2015/0372493 | A1 | 12/2015 | Sankar | |
| 2015/0372662 | A1 | 12/2015 | Niessen | |
| 2016/0064951 | A1 | 3/2016 | Yamamoto | |
| 2016/0064952 | A1 | 3/2016 | Matsumoto | |
| 2016/0072336 | A1 | 3/2016 | Tamino | |
| 2018/0034281 | A1 | 2/2018 | Tsai | |
| 2018/0138756 | A1 | 5/2018 | Bae | |
| 2018/0241257 | A1 | 8/2018 | Muratov | |

FOREIGN PATENT DOCUMENTS

| CN | 101924399 A | 12/2010 |
|---|---|---|
| CN | 102054057 A | 5/2011 |
| CN | 102055250 A | 5/2011 |
| CN | 102157991 A | 8/2011 |
| CN | 102396131 A | 3/2012 |
| CN | 202404630 U | 8/2012 |
| CN | 102957215 A | 3/2013 |
| CN | 103852631 A | 6/2014 |
| CN | 103855764 A | 6/2014 |
| CN | 103999325 A | 8/2014 |
| CN | 104160300 A | 11/2014 |
| CN | 104253492 A | 12/2014 |
| CN | 204190475 U | 3/2015 |
| CN | 105226845 A | 1/2016 |
| CN | 105308829 A | 2/2016 |
| CN | 106094041 A | 11/2016 |
| CN | 106134037 A | 11/2016 |
| CN | 106560730 A | 4/2017 |
| CN | 106571692 A | 4/2017 |
| CN | 106685029 A | 5/2017 |
| CN | 107615612 A | 1/2018 |
| EP | 2 555 107 A1 | 2/2013 |
| EP | 3 160 008 A1 | 4/2017 |
| JP | 2016-75484 A | 5/2016 |
| JP | 6122402 | 4/2017 |
| TW | 201513523 A | 4/2015 |
| TW | 201605143 A | 2/2016 |
| TW | I577108 B | 4/2017 |
| TW | I596546 B | 8/2017 |
| TW | I604678 B | 11/2017 |
| WO | 2016/159788 A1 | 10/2016 |
| WO | 2016/181658 A1 | 11/2016 |

OTHER PUBLICATIONS

Shinichi Fukuda et al., A novel metal detector using the quality factor of the secondary coil for wireless power transfer systems, <2012 IEEE MTT-S International Microwave Workshop Series on Innovative Wireless Power Transmission:Technologies, Systems, and Applications>, p. 241-244, 2012.

(56) References Cited

OTHER PUBLICATIONS

Farid Jolani et al., A novel planar wireless power transfer system with strong coupled magnetic resonances, 2014 IEEE International Wireless Symposium (IWS 2014), IEEE, Mar. 24-26, 2014, China, pp. 1-4.

Huang Xueliang et al., Review and Research Progress on Wireless Power Transfer Technology, Transactions of China Electrotechnical Society, vol. 28, No. 10, Oct. 2013, China, pp. 1-11, Oct. 2013.

* cited by examiner

SUPPLYING-END MODULE OF INDUCTION TYPE POWER SUPPLY SYSTEM AND SIGNAL DETECTION METHOD THEREOF

CROSS REFERENCE TO RELATED APPLICATIONS

This application is a continuation-in-part application of U.S. application Ser. No. 14/535,338 filed on Nov. 7, 2014, which is further a continuation-in-part application of U.S. application Ser. No. 14/251,655 filed on Apr. 14, 2014, a continuation-in-part application of U.S. application Ser. No. 14/017,321 filed on Sep. 4, 2013 and a continuation-in-part application of U.S. application Ser. No. 13/900,544 filed on May 23, 2013. U.S. application Ser. No. 14/251,655 is further a continuation-in-part application of U.S. application Ser. No. 14/017,321, and U.S. application Ser. No. 14/017,321 is further a continuation-in-part application of U.S. application Ser. No. 13/212,564, filed on Aug. 18, 2011 and a continuation-in-part application of U.S. application Ser. No. 13/541,090, filed on Jul. 3, 2012, wherein U.S. application Ser. No. 13/212,564 is further a continuation-in-part application of U.S. application Ser. No. 13/154,965, filed on Jun. 7, 2011. U.S. application Ser. No. 13/900,544 is further a continuation-in-part application of U.S. application Ser. No. 13/488,724 filed on Jun. 5, 2012, which is further a continuation-in-part application of U.S. application Ser. No. 13/154,965. The contents of these applications are incorporated herein by reference.

BACKGROUND OF THE INVENTION

1. Field of the Invention

The present invention relates to a supplying-end module of an induction type power supply system and a related signal detection method, and more particularly, to a method of detecting a smart card applicable to a supplying-end module of an induction type power supply system.

2. Description of the Prior Art

In an induction type power supply system, the power supply terminal has a driver circuit which drives the supplying-end coil to generate resonance, to deliver radio frequency electromagnetic waves. The coil in the power receiving terminal receives the energies of the electromagnetic waves and then performs electronic conversion, to generate DC power provided for a power receiving device. If electromagnetic energies sent by the supplying-end coil are exerted on a metal object, it may generate heat energies on the metal, and the metal object may be burnt and cause damages after accumulation of heat energies. In the prior art, the technology of detecting a metal object has been applied to the induction type power supply system. It is capable of effectively detecting a metal object that may be affected by the electromagnetic energies and thus dissipate heat, and providing protection by interrupting energy delivery after the metal object is found.

The smart cards, which are widely used in daily life, apply a technology such as the near field communication (NFC), radio frequency identification (RFID) or other similar technology to perform communications. The technology allows the smart card to capture tiny electromagnetic energies and then activate its internal chip to feedback data, where tiny electromagnetic energies are enough to activate the chip. In contrast, excessively large electromagnetic energies received by the smart card may damage the internal chip, such that an induction type power supply system may be harmful to this type of smart card devices.

In other words, the electromagnetic energies sent by the induction type power supply system are too strong for the smart card, and these energies received by the smart card always burnout the internal chip. However, the electromagnetic energies endurable by a smart card are quite small, and thus cannot be identified by the conventional detection technology of the induction type power supply system. A currently available reliable method is disposing a corresponding card reader together with the power sending coil of the induction type power supply system, and whether a smart card exists is interpreted by the card reader before electric power is sent. However, disposition of additional card reader requires additional costs, and different card readers are required for different smart cards having various standards. In addition to increase of the costs, the coil for sensing the smart cards also significantly increases the size of the device. Thus, there is a need for improvement over the prior art.

SUMMARY OF THE INVENTION

It is therefore an objective of the present invention to provide a method of detecting smart cards applicable to a supplying-end module of an induction type power supply system, which may utilize the supplying-end coil of the induction type power supply system to output detection signals for the smart cards, in order to realize detection of the smart cards and also improve the above problems.

An embodiment of the present invention discloses a supplying-end module for an induction type power supply system. The supplying-end module comprises a supplying-end coil, a first driver, a second driver and a signal detector. The first driver, coupled to the supplying-end coil, is used for driving the supplying-end coil to send electric power. The second driver, coupled to the supplying-end coil, is used for controlling the supplying-end coil to output a detection signal. The signal detector, coupled to the supplying-end coil, is used for detecting a reflection signal corresponding to the detection signal.

Another embodiment of the present invention discloses a signal detection method for a supplying-end module of an induction type power supply system. The supplying-end module comprises a supplying-end coil. The signal detection method comprises controlling the supplying-end coil to suspend electric power output by controlling a first driver to temporarily stop driving the supplying-end coil; using a second driver to drive the supplying-end coil to resonate during a period where the electric power output of the supplying-end coil is suspended; detecting a coil signal of the supplying-end coil to obtain a peak voltage level of the coil signal; setting a reference voltage to a level equal to the peak voltage level minus a predefined voltage; the second driver suspending driving the supplying-end coil and resuming driving the supplying-end coil by a specific number of times, to output a detection signal; and comparing the reference voltage with the coil signal to determine whether a reflection signal corresponding to the detection signal is received after outputting the detection signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
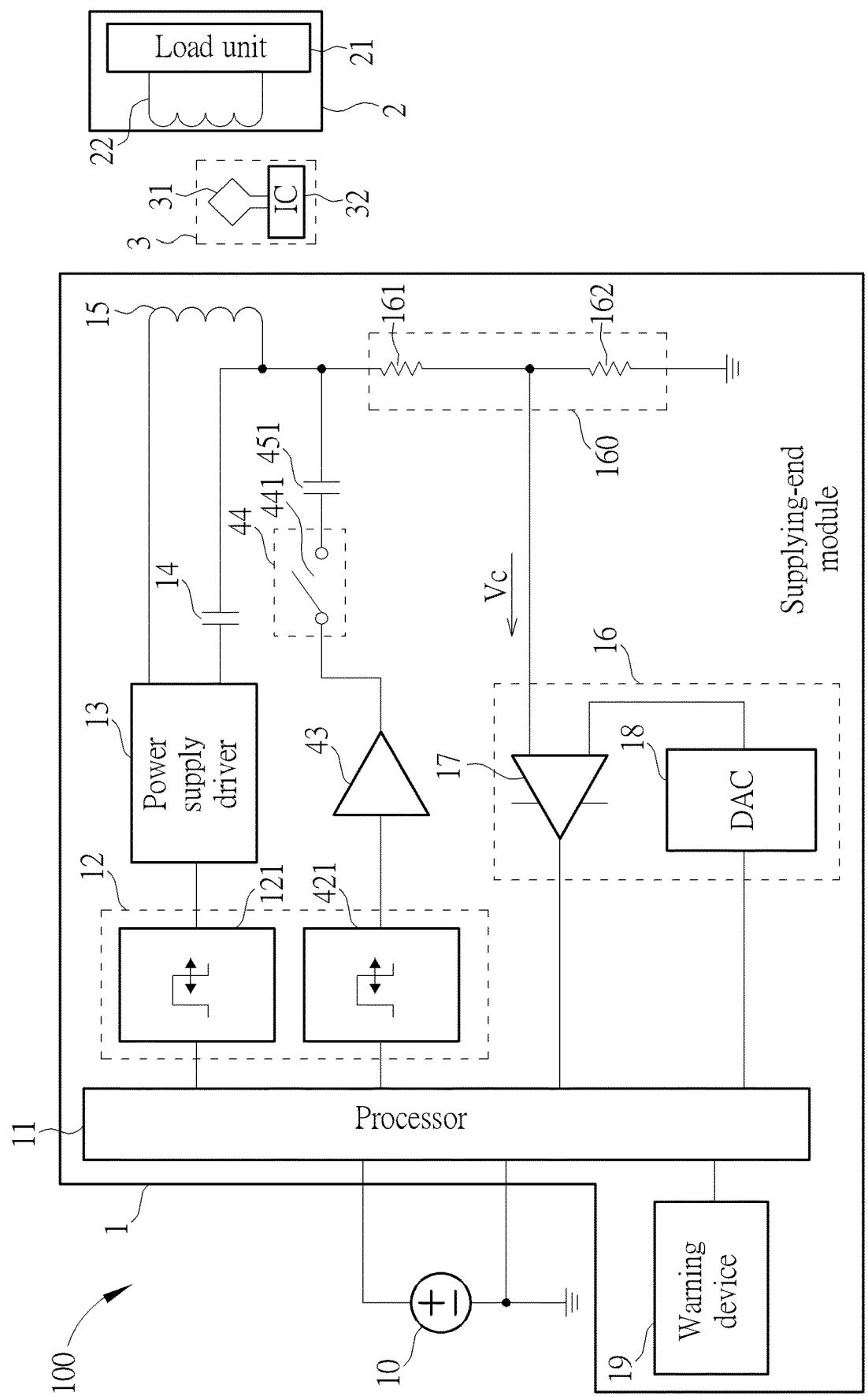
FIG. 1 is a schematic diagram of an induction type power supply system according to an embodiment of the present invention.

Please refer to FIG. 1, which is a schematic diagram of an induction type power supply system 100 according to an embodiment of the present invention. As shown in FIG. 1, the induction type power supply system 100 includes a supplying-end module 1 and a receiving-end module 2. The supplying-end module 1 may receive power from a power supply device 10. The supplying-end module 1 includes a processor 11, a clock generator module 12, a power supply driver 13, resonant capacitors 14 and 451, a high frequency driver 43, a switch module 44, a supplying-end coil 15, a signal detector 16, a warning device 19 and a voltage dividing circuit 160. The supplying-end coil 15 is used for sending electromagnetic energies to the receiving-end module 2 to supply electric power. The resonant capacitor 14, coupled to the supplying-end coil 15, is used for performing resonance together with the supplying-end coil 15 when electric power is supplied. The power supply driver 13, coupled to the resonant capacitor 14 and the supplying-end coil 15 and controlled by the processor 11, is used for sending driving signals to drive the supplying-end coil 15 to send electric power. The power supply driver 13 may apply full-bridge or half-bridge driving, which should not be limitation of the present invention. In addition, in the supplying-end module 1, a magnetic conductor (not illustrated) composed of magnetic materials may be selectively disposed, to enhance the electromagnetic induction capability of the supplying-end coil 15 and also prevent electromagnetic energies from affecting the objects located in the non-inducting side of the coil.

In the embodiments of the present invention, the supplying-end coil 15 is not only used for sending electric power, but also used for detecting smart cards. In detail, the high frequency driver 43 is coupled to the supplying-end coil 15 via the resonant capacitor 451, for controlling the supplying-end coil 15 to output a detection signal. This detection signal may detect the existence of a smart card. The switch module 44 includes a switch 441 coupled between the high frequency driver 43 and the resonant capacitor 451, for controlling operations of the high frequency driver 43. When the supplying-end coil 15 needs to output electric power, the switch 441 may be turned off. When the supplying-end coil 15 needs to output a detection signal, the switch 441 may be turned on, to enable the operations of the high frequency driver 43 driving the supplying-end coil 15. In addition, the power supply driver 13 may also include a switch (not illustrated). This switch is turned on to enable the power supply driver 13 when the supplying-end coil 15 outputs electric power. When the supplying-end coil 15 outputs a detection signal, this switch turns off the power supply driver 13 and couples a terminal of the supplying-end coil 15 not receiving driving signals of the high frequency driver 43 to a ground terminal.

After the supplying-end coil 15 outputs a detection signal, the signal detector 16 may detect a reflection signal corresponding to the detection signal. In an embodiment, the signal detector 16 may consist of a comparator 17 and a digital to analog converter (DAC) 18, for tracking peak values of a coil signal Vc of the supplying-end coil 15 and accordingly detecting the reflection signal. The voltage dividing circuit 160 includes voltage dividing resistors 161 and 162, which may attenuate the coil signal Vc on the supplying-end coil 15 and then output the coil signal Vc to the signal detector 16. In some embodiments, if the tolerance voltages of the circuits in the processor 11 and the signal detector 16 are high enough, the voltage dividing circuit 160 may not be applied and the signal detector 16 may directly receive the coil signal Vc from the supplying-end coil 15.

In addition, the processor 11 may receive detection results of the signal detector 16 to determine whether a smart card exists, so as to control the operations of the power supply driver 13 and the supplying-end coil 15, e.g., to control whether to output electric power. The processor 11 may be any type of processing device, such as a central processing unit (CPU), a microprocessor, a microcontroller unit (MCU). The clock generator module 12 includes clock generators 121 and 421, for outputting clock signals to the power supply driver 13 and the high frequency driver 43, respectively. The clock generator module 12 may be realized with pulse width modulation generators (PWM generators) or any other type of clock generators. The warning device 19, which may be selectively disposed in the supplying-end module 1, may generate a warning signal to notify a user of the induction type power supply system 100 to remove the smart card when the processor 11 determines that the smart card exists. The warning device 19 may notify the user by any method, such as a display light, a buzzer, a speaker, or displaying on the screen. Other possible components or modules such as a power supply unit and display unit may be included or not according to system requirements. These components are omitted herein without affecting the illustrations of the present embodiments.

Please keep referring to FIG. 1. The receiving-end module 2 includes a load unit 21 and a receiving-end coil 22. The receiving-end coil 22 is used for receiving electric power from the supplying-end coil 15. The load unit 21 refers to various elements or modules included in the receiving-end coil 22, such as the regulator circuit, resonant capacitor, rectifier circuit, signal feedback circuit, receiving-end processor. These elements and modules may be included or not according to system requirements, and should not be limitations of the scope of the present invention. In addition, a smart card 3, which is not included in the induction type power supply system 100 but illustrated in FIG. 1, may be a smart card complying with the standards of NFC, for example. The smart card 3 may include a coil 31 and an integrated circuit (IC) 32.

Figure 2:
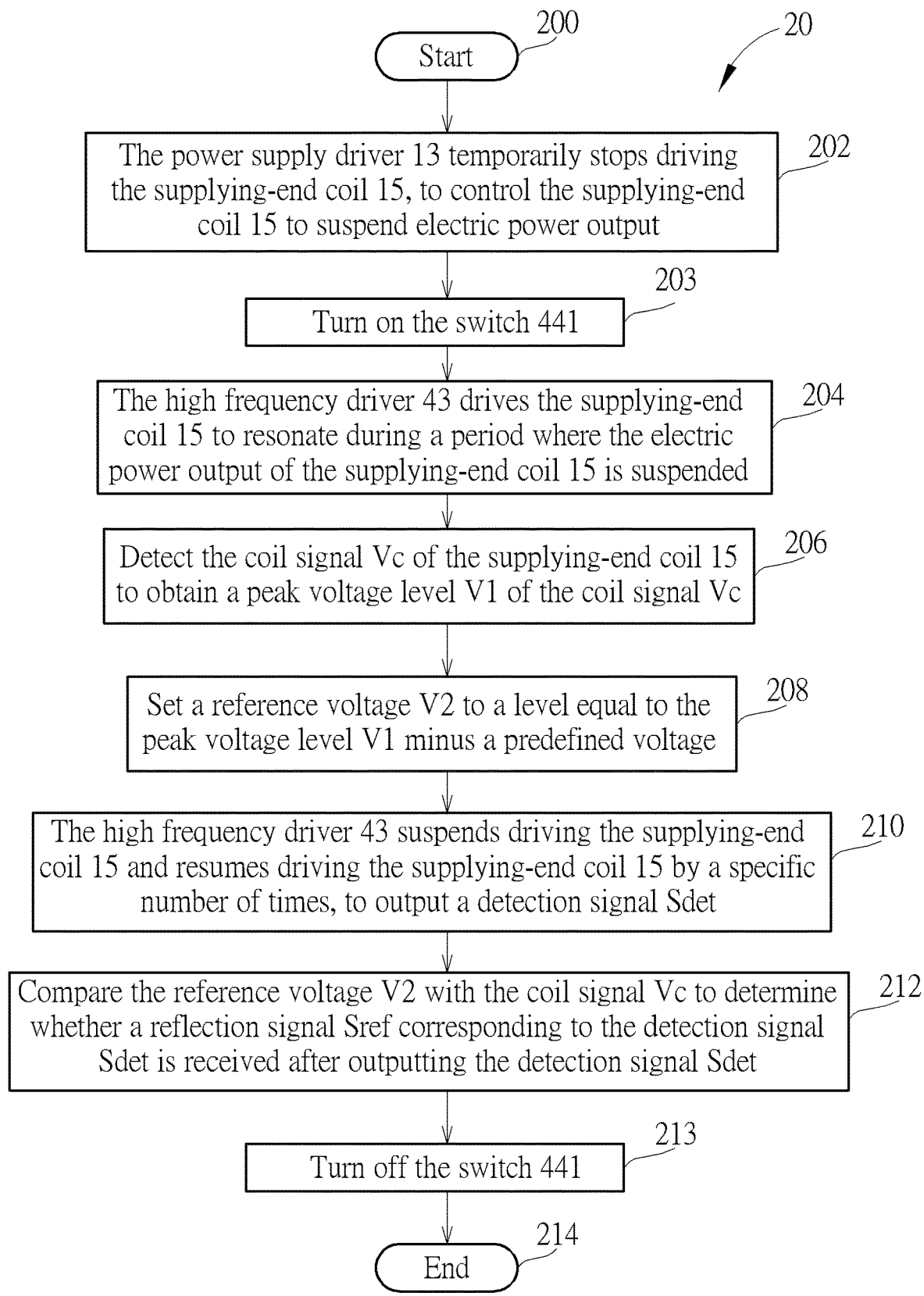
FIG. 2 is a schematic diagram of a signal detection process according to an embodiment of the present invention.

Please refer to FIG. 2, which is a schematic diagram of a signal detection process 20 according to an embodiment of the present invention. The signal detection process 20, which may be used for a supplying-end module of an induction type power supply system (e.g., the supplying-end module 1 of the induction type power supply system 100 shown in FIG. 1), includes the following steps:

Step 200: Start.

Step 202: The power supply driver 13 temporarily stops driving the supplying-end coil 15, to control the supplying-end coil 15 to suspend electric power output.

Step 203: Turn on the switch 441.

Step 204: The high frequency driver 43 drives the supplying-end coil 15 to resonate during a period where the electric power output of the supplying-end coil 15 is suspended.

Step 206: Detect the coil signal Vc of the supplying-end coil 15 to obtain a peak voltage level V1 of the coil signal Vc.

Step 208: Set a reference voltage V2 to a level equal to the peak voltage level V1 minus a predefined voltage.

Step 210: The high frequency driver 43 suspends driving the supplying-end coil 15 and resumes driving the supplying-end coil 15 by a specific number of times, to output a detection signal Sdet.

Step 212: Compare the reference voltage V2 with the coil signal Vc to determine whether a reflection signal Sref corresponding to the detection signal Sdet is received after outputting the detection signal Sdet.

Step 213: Turn off the switch 441.

Step 214: End.

According to the signal detection process 20, output of the detection signal Sdet may be performed during the period where the supplying-end coil 15 suspends electric power output. Since delivery of electric power and output of detection signals utilize the same supplying-end coil 15, the operations of delivery of electric power and output of detection signals should be performed with time division. In this embodiment, the power supply driver 13 may temporarily stop driving to control the supplying-end coil 15 to suspend the electric power output, and the high frequency driver 43 drives the supplying-end coil 15 to resonate. In general, the energy quantity outputted by the supplying-end coil 15 is determined by various factors such as the amplitude of driving signals outputted by the driver, the capacitance value of the resonant capacitor, the inductance value of the supplying-end coil 15, and the operating frequency. When the power supply driver 13 drives the supplying-end coil 15 to output electric power, the output energies should be larger; hence, the power supply driver 13 should output larger signal amplitude, and also the resonant capacitor 14 with a larger capacitance value is required, so that the supplying-end coil 15 may be operated in a lower frequency. When the high frequency driver 43 drives the supplying-end coil 15 to resonate, the corresponding resonant capacitor 451 may have a smaller capacitance value (usually far smaller than the value of the resonant capacitor 14) with the usage of the same supplying-end coil 15 (having the same inductance value); hence, the supplying-end coil 15 may be operated in a higher frequency, and the amplitude of the output signal is lower and able to be received by a smart card. In an embodiment, the driving capability of the high frequency driver 43 may further be reduced, or a resistor is disposed between the high frequency driver 43 and the supplying-end coil 15, to reduce the amplitude of the output signal of the high frequency driver 43.

According to the standard of a general short-distance communication interface (e.g., the NFC), the communication devices are classified into a host device and a slave device. The host device may be a card reader, and the slave device may be a smart card. The slave device may usually apply a no-power mechanism, i.e., the device needs not to receive electric power in standby. The host device may intermittently send signals, where the signals carry electromagnetic energies and have a specific frequency. When the slave device approaches the host device, if the signal received by the slave device has a frequency identifiable by the slave device, the slave device may be activated by using the received signal energies. After the slave device is activated, the coil may reflect a reflection signal/data via the load modulation technology. In other words, the host device may transmit signals by a polling method. After the slave device receives the polling signal, the slave device may feedback an identification code to the host device at a specific time point. If the slave device does not receive the polling signal, the slave device may not perform any operation.

In an embodiment, in order to detect the smart cards of the NFC standards by letting the supplying-end coil 15 to output a detection signal having the standard of NFC, the high frequency driver 43 should drive the supplying-end coil 15 to be operated at the frequency 13.56 MHz. In comparison, when the power supply driver 13 drives the supplying-end coil 15 to output electric power, the operating frequency is approximately 100 kHz. In such a condition, the capacitance value of the resonant capacitor 14 should be greater than the capacitance value of the resonant capacitor 451, in order to control the supplying-end coil 15 to be operated in an appropriate frequency.

In this embodiment, the step of the high frequency driver 43 driving the supplying-end coil 15 to output the detection signal may be performed during the period where the power supply driver 13 controls the supplying-end coil 15 to suspend the electric power output. In another embodiment, the step of outputting the detection signal may be performed before the supplying-end coil 15 starts to output electric power, in order to determine whether a smart card exists before electric power is outputted.

Figure 3:
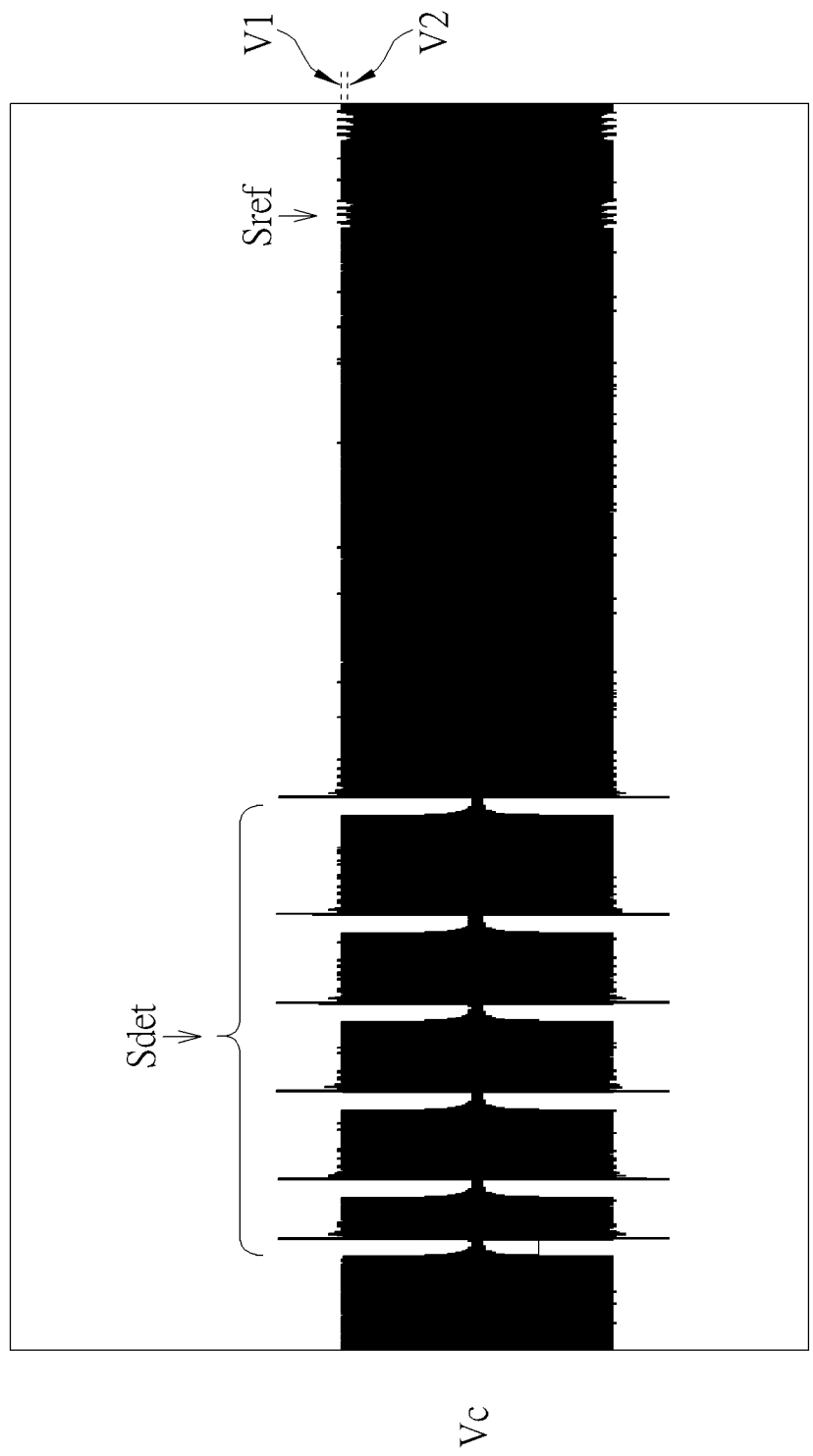
FIG. 3 is a waveform diagram of the sent detection signal for detecting the corresponding reflection signal according to an embodiment of the present invention.

Subsequently, the supplying-end coil 15 may send a detection signal similar to a polling signal. Please refer to FIG. 3, which is a waveform diagram of the sent detection signal Sdet for detecting the corresponding reflection signal Sref according to an embodiment of the present invention. FIG. 3 illustrates the waveform of the coil signal Vc of the supplying-end coil 15 (i.e., the voltage signal between the supplying-end coil 15 and the resonant capacitor 14). The high frequency driver 43 may drive the supplying-end coil 15 to generate oscillation on the coil signal Vc. Subsequently, the high frequency driver 43 may intermittently suspend driving the supplying-end coil 15 by multiple number of times, i.e., suspend driving the supplying-end coil 15 and then resume driving the supplying-end coil 15 by a specific number of times, to control the supplying-end coil 15 to output the detection signal Sdet. This specific number of times may be a number of times specified by the standard of the smart card, but should not be limited herein. At this moment, if a smart card 3 exists in the neighbor of the supplying-end coil 15, the coil 31 of the smart card 3 may detect the detection signal Sdet and respond with the reflection signal Sref after a predetermined time. The reflection signal Sref may generate modulation on the amplitude of the coil signal Vc, so that an amplitude falling section appears on the coil signal Vc, as shown in FIG. 3.

In order to detect the amplitude variations on the coil signal Vc to determine the reflection signal Sref, the signal detector 16 may obtain and track the peak voltage level V1 of the coil signal Vc before the reflection signal Sref arrives. The method of tracking the peak voltage level V1 is introduced in U.S. Publication No. 2016/0349782 A1, and will not be narrated herein. Subsequently, the processor 11 may set the reference voltage V2 to a voltage level equal to the peak voltage level V1 minus a predefined voltage, where the predefined voltage may be determined according to the standard of the smart card and the pattern of the related reflection signal Sref. In an embodiment, if a smart card complies with the NFC standard, the smart card may feedback the reflection signal Sref with 10% amplitude modulation; that is, the reflection signal Sref decreases the peak voltage on the coil signal Vc by a level substantially equal to 10% of its amplitude. In such a condition, the magnitude of the predefined voltage may be set to be close to but not exceed one tenth of the amplitude generated when the high frequency driver 43 drives the supplying-end coil 15 to resonate. In other words, the level of the reference voltage V2 is controlled to be slightly higher than 90% of the resonant amplitude of the coil signal Vc, as shown in FIG. 3. In such a condition, the processor 11 may control the digital to analog converter 18 to output the reference voltage V2 to an input terminal of the comparator 17, while another input terminal of the comparator 17 receives the coil signal Vc, to compare the coil signal Vc with the reference voltage V2, so as to determine whether the reflection signal Sref is received.

As can be seen from above, the signal detector of the present invention has a structure identical to the comparator module for detecting intruding metal described in U.S. Publication No. 2016/0349782 A1. In other words, the same circuit structure is shared by intruding metal detection and smart card detection, which reduces additional circuit costs.

Further, when the reflection signal Sref appears, the comparator 17 of the signal detector 16 may detect a peak voltage on the coil signal Vc lower than the reference voltage V2. The signal detector 16 thereby determines that the reflection signal Sref is received and transmits related information to the processor 11. The processor 11 thereby determines whether a smart card 3 exists in the power supply range of the supplying-end coil 15. Note that the smart card 3 should respond with the reflection signal Sref in 86 microseconds after receiving the detection signal Sdet according to the NFC standard. Therefore, setting of the reference voltage V2 may be accomplished within 86 microseconds after the detection signal Sdet is outputted, in order to successfully detect the reflection signal Sref.

In such a condition, if the smart card detection is performed during a period where power output of the supplying-end coil 15 is suspended, the processor 11 may control the supplying-end coil 15 to completely terminate sending of electric power when the smart card 3 is detected. If the smart card detection is performed before the supplying-end coil 15 starts to output electric power, the processor 11 may control the supplying-end coil 15 not to start to send electric power when the smart card 3 is detected. In an embodiment, the processor 11 may control the warning device 19 to generate a warning signal provided for a user of the induction type power supply system 100, to notify user to remove the smart card. The supplying-end module 1 then restarts to perform the above steps of detecting whether a smart card 3 exists. The supplying-end module 1 may restart to send electric power only if determining that the smart card 3 is removed.

In addition, if the reflection signal Sref is not detected during a detection period, there may be no smart card 3 existing in the power supply range of the supplying-end coil 15. In such a condition, the processor 11 may control the supplying-end coil 15 to continue to send electric power via the power supply driver 13, and then suspend the delivery of electric power again to perform the steps of detecting whether a smart card 3 exists after electric power is outputted for a period of time. Alternatively or additionally, after confirming that the smart card is not exist, the supplying-end module 1 may further perform other detections before sending electric power such as intruding metal detection.

Please note that the present invention aims at using the coil of an induction type power supply system to detect whether a smart card is near the coil or in the power supply range of the coil, to prevent the smart card from being burnt by the electromagnetic energies outputted by the coil. Taking the supplying-end module 1 shown in FIG. 1 as an example, when the processor 11 determines that the reflection signal Sref is received, the processor 11 may control the supplying-end coil 15 to stop outputting electric power, and the processor 11 does not need to perform follow-up decoding operations on the reflection signal Sref. In other words, different from a conventional card reader that decodes the data fed back from the smart card to obtain detailed information of the smart card after receiving the data, the present invention only needs to determine the existence of smart card, and it is unnecessary to obtain the serial number, content or other related information of the smart card.

In addition, the supplying-end module and the signal detection method of the present invention may also be capable of detecting smart cards other than those comply with the NFC standard. Please refer to FIG. 4, which is a schematic diagram of another induction type power supply system 400 according to an embodiment of the present invention. The structure of the induction type power supply system 400 is similar to the structure of the induction type power supply system 100, so the signals and elements with identical functions are denoted by the same symbols. The main difference between the induction type power supply system 400 and the induction type power supply system 100 is that, the supplying-end module 1 of the induction type power supply system 400 further includes a resonant capacitor 452 coupled between the supplying-end coil 15 and the high frequency driver 43. The resonant capacitor 452 is controlled by another switch 442 in the switch module 44. In addition, in the induction type power supply system 400, the supplying-end module 1 has a C-L-C coil structure, i.e., a terminal of the supplying-end coil 15 is coupled to the resonant capacitor 14 and another terminal of the supplying-end coil 15 is coupled to another resonant capacitor 141, so that the power supply driver 13 may perform driving with two resonant capacitors. Further, in the supplying-end module 1 of the induction type power supply system 400, the switch module 44 further includes a switch 443 coupled between a terminal of the supplying-end coil 15 and the ground terminal. In this embodiment, the switches 441, 442 and 443 are included in the switch module 44, which may be realized with a chip. Alternatively, each switch may be disposed independently. In addition, a resistor R1 is disposed at the output terminal of the high frequency driver 43, for reducing the output power of the high frequency driver 43 driving the supplying-end coil 15.

In the supplying-end module 1 of the induction type power supply system 400, the high frequency driver 43 is coupled to the supplying-end coil 15 respectively via the resonant capacitors 451 and 452. In the switch module 44, the switch 441 or 442 may be selectively turned on, in order to perform resonance via the resonant capacitor 451 or 452. Preferably, the resonant capacitors 451 and 452 have different capacitance values, so that the high frequency driver 43 may generate resonance with different frequencies on the coil signal Vc by using different resonant capacitors 451 and 452, in order to perform smart card detection indifferent frequency bands, allowing the detection of different types of smart cards or those having different standards. In an embodiment, the switches 441 and 442 in the switch module 44 may be turned on simultaneously, allowing the resonant capacitors 451 and 452 to be connected in parallel to generate another capacitance value, in order to generate another distinct resonant frequency. In addition, there may be more than two capacitors disposed between the high frequency driver 43 and the supplying-end coil 15, and the switch module 44 may control the high frequency driver 43 to be coupled to the supplying-end coil 15 via any one or more of these capacitors, in order to realize resonance in more different frequencies on the coil signal Vc. The number and disposition method of the capacitor(s) and the corresponding resonant frequencies may be determined based on various smart card standards and detection requirements, which should not be limitation of the present invention.

In another embodiment, in addition to the high frequency driver 43, the supplying-end module 1 may also include one or more additional high frequency drivers that may output different detection signals. These high frequency drivers may generate different resonant frequencies on the coil signal Vc, for detecting different types of smart cards or those having different standards.

Figure 4:
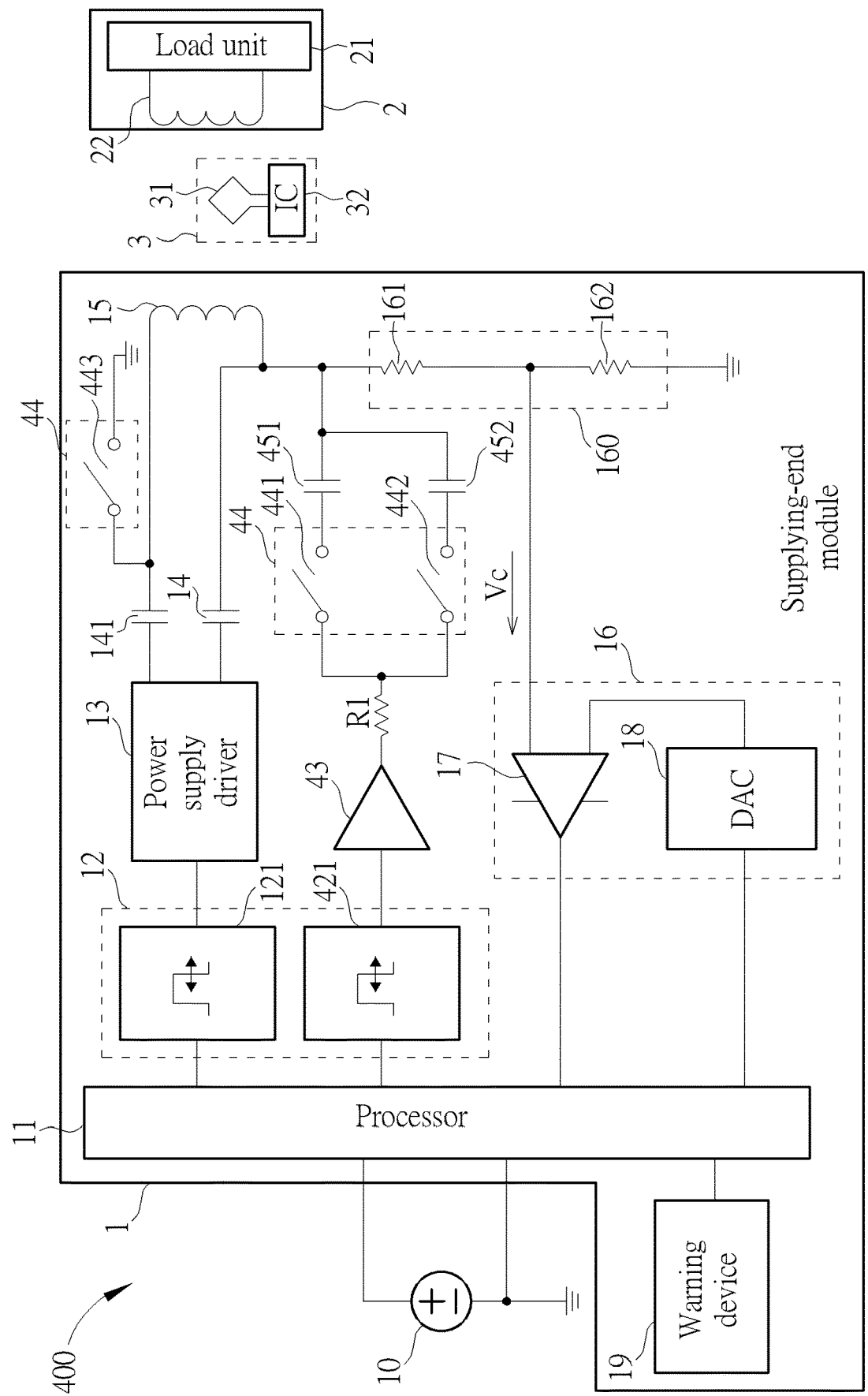
FIG. 4 and FIG. 5 are schematic diagrams of other induction type power supply systems according to embodiments of the present invention.

Please keep referring to FIG. 4. In the supplying-end module 1 of the induction type power supply system 400, during the period where the supplying-end coil 15 outputs electric power, all of the switches 441 and 442 for the high frequency driver 43 may be turned off, to prevent the stronger driving signals of the power supply driver 13 from being transmitted to the high frequency driver 43 and damaging the high frequency driver 43. During the period of smart card detection, in addition to turning on the switches 441 and/or 442 for the high frequency driver 43, the control switch 443 may also be turned on, so that another terminal of the supplying-end coil 15 may be coupled to the ground terminal as a reference point for resonance. Similarly, in the supplying-end module 1 shown in FIG. 1, the power supply driver 13 may also include a switch connectable to the ground terminal, and the switch may be turned on during the period of smart card detection.

Figure 5:
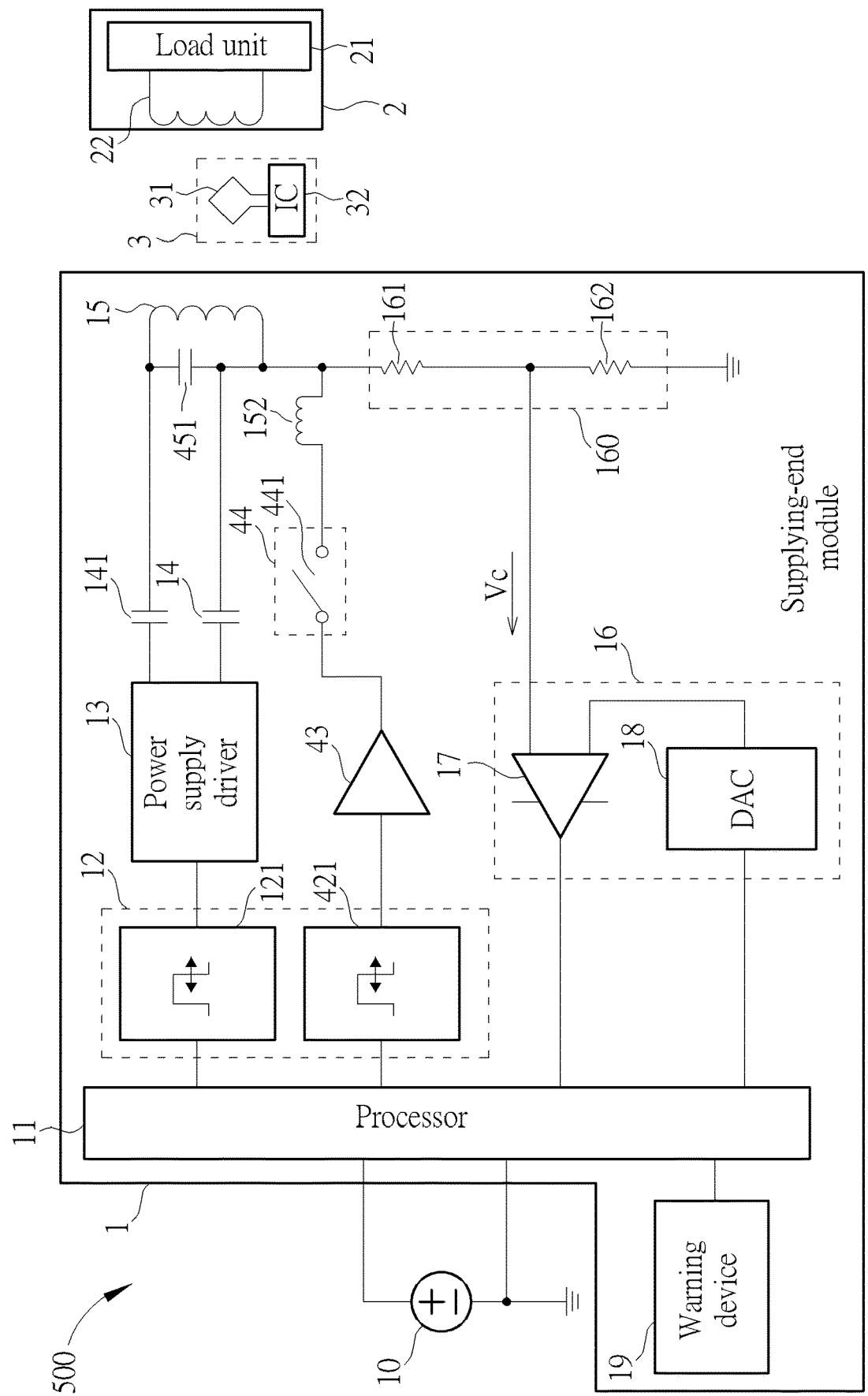

In addition, the capacitor(s) for performing resonance with the high frequency driver 43 may be disposed in other manners. For example, please refer to FIG. 5, which is a schematic diagram of another induction type power supply system 500 according to an embodiment of the present invention. The structure of the induction type power supply system 500 is similar to the structure of the induction type power supply system 100, so the signals and elements with identical functions are denoted by the same symbols. The main difference between the induction type power supply system 500 and the induction type power supply system 100 is that, the supplying-end module 1 of the induction type power supply system 500 further includes a resonant capacitor 141 coupled between the supplying-end coil 15 and the power supply driver 13. The resonant capacitor 141 together with the supplying-end coil 15 and the resonant capacitor 14 form a C-L-C coil structure. In addition, in the supplying-end module 1 of the induction type power supply system 500, the resonant capacitor 451 for performing resonance with the high frequency driver 43 is connected with the supplying-end coil 15 in parallel, and an inductor 152 is disposed between the high frequency driver 43 and the supplying-end coil 15 (which may be implemented with a smaller coil).

In the supplying-end module 1 of the induction type power supply system 500, the resonant capacitors 14 and 141 and the supplying-end coil 15 construct a resonant circuit having a lower frequency, and this resonant circuit generates resonance when driven by the power supply driver 13. The resonant capacitor 451 and the supplying-end coil 15 are connected with the inductor 152 to construct a resonant circuit having a higher frequency, which may generate a high frequency resonant signal as driven by the high frequency driver 43 during the period of smart card detection. Since the value of the resonant capacitor 451 is far smaller than the values of the resonant capacitors 14 and 141, when the power supply driver 13 drives the C-L-C structure of the resonant capacitor 141, the supplying-end coil 15 and the resonant capacitor 14 to output electric power, the operating frequency is far lower than the resonant loop formed by the resonant capacitor 451. In such a situation, the effects of the resonant capacitor 451 may be ignored.

To sum up, the present invention provides a signal detection method applicable to an induction type power supply system, for detecting whether a smart card exists in the power supply range of the induction type power supply system, so as to prevent the smart card from being burnt by receiving excessive energies delivered by the supplying-end coil of the induction type power supply system. In the embodiments of the present invention, electric power output and smart card detection may be implemented with the same coil with time division. Signal detection for a smart card may be performed during a period where the supplying-end coil suspends electric power output. When the processor detects a reflection signal and determines that a smart card exists, the processor may control the supplying-end coil to stop sending electric power or not start to send electric power. The processor only needs to determine the existence of smart card, and it is unnecessary to perform decoding on the reflection signal to obtain other information of the smart card. In addition, in the embodiments of the present invention, the supplying-end coil of the induction type power supply system may be used to implement the functions of sending electric power and detecting smart cards; hence, no additional card reader is required, which saves the costs of card reader. Also, the user may dispose different numbers of capacitors having different values, and/or apply multiple high frequency drivers corresponding to different resonant frequencies, in order to perform detection on different frequency bands. Therefore, the present invention is applicable to detection of various types of smart cards.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supplying-end module, for an induction type power supply system, the supplying-end module comprising:
   a supplying-end coil;
   a first driver, coupled to the supplying-end coil, for driving the supplying-end coil to send electric power;
   a second driver, coupled to the supplying-end coil, for controlling the supplying-end coil, allowing the supplying-end coil to output a detection signal; and
   a signal detector, coupled to the supplying-end coil, for detecting a reflection signal in response to the detection signal.

2. The supplying-end module of claim 1, further comprising:
   a first resonant capacitor, coupled between the supplying-end coil and the first driver; and a second resonant capacitor, coupled between the supplying-end coil and the second driver;
wherein a capacitance value of the first resonant capacitor is greater than a capacitance value of the second resonant capacitor.

3. The supplying-end module of claim 2, further comprising:
at least one third resonant capacitor, coupled between the supplying-end coil and the second driver, wherein capacitance values of the at least one third resonant capacitor are different from each other, and different from the capacitance value of the second resonant capacitor; and
a switch module, for controlling the second driver to select to connect with the supplying-end coil via at least one of the second resonant capacitor and the at least one third resonant capacitor.

4. The supplying-end module of claim 3, wherein the switch module further controls the supplying-end coil to be coupled to a ground terminal.

5. The supplying-end module of claim 1, further comprising a processor, wherein the processor determines that a smart card exists in a power supply range of the supplying-end coil when the signal detector determines that the supplying-end coil receives the reflection signal.

6. The supplying-end module of claim 5, wherein the processor controls the supplying-end coil to stop sending electric power or not to start to send electric power when determining that the smart card exists in the power supply range of the supplying-end coil.

7. The supplying-end module of claim 5, further comprising:
a warning device, for generating a warning signal provided for a user of the induction type power supply system when the processor determines that the smart card exists in the power supply range of the supplying-end coil.

8. The supplying-end module of claim 5, wherein when the supplying-end coil receives the reflection signal, the processor does not decode the reflection signal.

9. The supplying-end module of claim 1, wherein the signal detector comprises:
a digital to analog converter (DAC), for providing a reference voltage; and
a comparator, coupled to the DAC, for comparing the reference voltage with a coil signal of the supplying-end coil, to determine whether the reflection signal is received.

10. The supplying-end module of claim 1, wherein the second driver suspends driving the supplying-end coil and resumes driving the supplying-end coil by a specific number of times, to control the supplying-end coil to output the detection signal.

11. The supplying-end module of claim 1, further comprising:
at least one third driver, coupled to the supplying-end coil, for controlling the supplying-end coil to output another detection signal;
wherein the at least one third driver drives the supplying-end coil with resonant frequencies different from each other and different from a resonant frequency of the second driver driving the supplying-end coil.

12. The supplying-end module of claim 1, further comprising:
a resistor, coupled between the supplying-end coil and the second driver.

13. The supplying-end module of claim 1, further comprising:
a first resonant capacitor, coupled between the supplying-end coil and the first driver;
a second resonant capacitor, coupled to the supplying-end coil in parallel; and
an inductor, coupled between the supplying-end coil and the second driver.

14. A signal detection method, for a supplying-end module of an induction type power supply system, the supplying-end module comprising a supplying-end coil, the signal detection method comprising:
controlling the supplying-end coil to suspend electric power output by controlling a first driver to temporarily stop driving the supplying-end coil;
using a second driver to drive the supplying-end coil to resonate during a period where the electric power output of the supplying-end coil is suspended;
detecting a coil signal of the supplying-end coil to obtain a peak voltage level of the coil signal;
setting a reference voltage to a level equal to the peak voltage level minus a predefined voltage;
the second driver suspending driving the supplying-end coil and resuming driving the supplying-end coil by a specific number of times, to output a detection signal; and
comparing the reference voltage with the coil signal to determine whether a reflection signal corresponding to the detection signal is received after outputting the detection signal.

15. The signal detection method of claim 14, wherein the predefined voltage is slightly lower than one tenth of a resonant amplitude of the supplying-end coil driven by the second driver.

16. The signal detection method of claim 14, wherein the step of comparing the reference voltage with the coil signal to determine whether the reflection signal corresponding to the detection signal is received after outputting the detection signal comprises:
determining that the reflection signal is received when detecting that the peak voltage level of the coil signal is lower than the reference voltage during a period after the detection signal is outputted.

17. The signal detection method of claim 14, further comprising:
determining that a smart card exists in a power supply range of the supplying-end coil when determining that the reflection signal is received.

18. The signal detection method of claim 17, further comprising:
the supplying-end coil stopping sending electric power or not starting to send electric power when the smart card is determined to exist in the power supply range of the supplying-end coil.

19. The signal detection method of claim 17, further comprising:
generating a warning signal provided for a user of the induction type power supply system when the smart card is determined to exist in the power supply range of the supplying-end coil.

20. The signal detection method of claim 14, wherein when the supplying-end coil receives the reflection signal, the supplying-end module does not decode the reflection signal.

* * * * *